Patented Apr. 15, 1952

2,592,988

UNITED STATES PATENT OFFICE 2,592,988

COAGULATION-RESISTANT CREAM STYLE CORN AND PROCESS FOR PREPARING THE SAME

Robert A. Whitmore, Saratoga, and Frank D. Hickey, Mountain View, Calif., assignors to Food Machinery and Chemical Corporation, San Jose, Calif., a corporation of Delaware No Drawing. Application April 18, 1950, Serial No. 156,726

9 Claims. (Cl. 99—186)

1

The present invention relates to the preparation of "maize" or "corn," as it is more commonly known, for human consumption; more particularly the present invention relates to the preparation of the corn varieties known as "sweet corn" for preservation in sealed containers in the form of a food product known as "cream-style corn."

In preparing cream-style corn, ears of sweet corn are husked, trimmed and washed and may then, according to one method, be processed in a machine generally known as a "cream-style cutter," which cuts off the caps from the corn kernels and thereafter scrapes the interior from the kernel bases remaining on the cob. The kernel caps thus obtained provide the solid component of the food product, while the substance scraped from the interior of the kernel bases, which is generally known as the "scrapings," is processed to form the cream portion of the product. For this purpose the mixture of caps and scrapings produced by the action of the cream-style cutter is first cleaned by screening out cob fragments, corn silk and other debris in specially designed equipment and is thereafter blended in apparatus termed "batch mixers" with a solution of salt, sugar and sometimes corn starch, according to a formula that varies, depending upon the maturity of the processed corn. According to another method of preparing cream-style corn the whole kernels are removed from the corn cobs and instead of kernel caps whole kernels, or large sections thereof, are used as the solid component of the product, while its cream component is formed by a quantity of ground kernels, both said ground kernels and said whole kernels, or kernel sections, being blended in batch mixers with the necessary cream additives, such as water, salt, sugar and corn starch in much the same manner as the corn caps and scrapings of the initially described process. In large scale production the contents of several batch mixers may later be combined in a large tank to secure an output of uniform quality, whereupon the consistency of the product is usually standardized in suitable consistometers by adding the proper amounts of water. The resultant product may then be filled into cans and sterilized within the cans, after they have been hermetically sealed.

Proper sterilization of cream-style corn requires relatively long cooking periods which produce changes in the corn product that harmfully affect its appearance and palatability. Thus, extended application of high temperatures produces caramelization, especially in the regions adjacent to the container walls, which darkens the attractive color of fresh corn and destroys its delicate flavors, so that the marketability of the final product is appreciably impaired.

It has been found that the cooking period ordinarily required to properly sterilize cream-style corn may be materially shortened if the product is agitated during sterilization. Such agitation produces a more rapid heat penetration in that it increases the rate of heat transfer by the production of forced heat convection currents as compared to the mere conduction-type of heat transfer obtained when the product is sterilized in stationary condition. Thus, by the simple expedient of rolling or tumbling the cans or by conducting the product in a continuous flow through a tubular heat exchanger the sterilization time may be decreased by as much as 50% or even more. However, while such a reduction of the sterilization period may be expected to produce conspicuous improvements in the color and flavor of the final product, sterilization of cream-style corn under agitation causes, almost invariably, coagulation of the cream portion of the mix; in fact, cream-style corn is frequently so sensitive in this respect that coagulation may even occur during stirring at the moderate temperatures in the batch mixer or the blending tank.

It is an object of the present invention to provide a coagulation-resistant cream-style corn.

Another object is to provide a sterilized cream-style corn of a color and flavor that closely resembles freshly made cream-style corn.

Yet another object is to provide a cream-style corn that may be heated under agitation without exhibiting harmful coagulation.

An additional object is to provide a method of preparing a sterilized cream-style corn in such a manner that it retains substantially the color and flavor of freshly made cream-style corn.

Yet another object is to provide a method of preparing a sterilized cream-style corn which, though involving agitation of the product at elevated temperatures to achieve proper sterilization of said product without appreciable impairment of its color and flavor, maintains coagulation of the cream fraction of said product at a minimum.

A special object of this invention is to provide a process of manufacturing cream-style corn that permits sterilization in continuous cookers without the appearance of visible signs of coagulation in the sterilized product.

The invention is based upon the observation that small additions of a particular halogen-treated corn starch render cream-style corn products highly coagulation-resistant so that they may without visible signs of coagulation be subjected to such agitation during the sterilization process as will shorten the sterilization period to an extent that preserves the bright color and pleasant aroma of freshly prepared cream-style corn.

In accordance with the invention we use in the preparation of cream-style corn quantities of a corn starch of the order of from 0.25% to 1.0% by weight of the finished product. The corn starch we use has been modified by a controlled halogen treatment to form a "thick-boiling" starch. By "thick-boiling" starch we mean a starch that has a materially higher viscosity when cooked to a paste at a temperature of the order of 212° F. than would be exhibited under equal conditions by an unmodified starch.

As is well known, all starches, during their manufacture are liable to become more or less contaminated with the heat resistant spores of thermophilic anaerobic spoilage organisms. The use of highly contaminated starch in canned foods renders them more liable to spoilage after sterilization and the starch to be used for canning is therefore commonly subjected to such high temperatures as will destroy most of these heat resistant spores. We have found, however, that high temperatures destroy the very characteristics in the above described corn starch that render its use so valuable in the preparation of cream-style corn. It is important, therefore, that the starch to be added to cream-style corn in accordance with our invention have its bacterial count reduced to low value without subjecting it to high temperatures. One method of so treating the above defined corn starch in a manner that preserves its coagulation-inhibiting quality is to subject it in dry condition to moderate temperatures, such as from 110° to 115° F. within a high vacuum for at least an hour and thereafter expose it at the same moderate temperatures to substantially undiluted ethylene oxide gas for a period of from two to three hours. By the described treating process the bacteria count of the particular starch here under consideration may be reduced to a negligible amount well below the count considered acceptable by the industry and the starch thus treated exhibits substantially the same effectiveness in inhibiting coagulation of cream-style corn as in unsterilized condition.

In an exemplary process for the manufacture of a sterilized cream-style corn in accordance with our invention husked ears of a corn known under the name of Crookham's Golden Cross grown in Idaho in the 1949 season were delivered to a cream-style cutter which was adjusted to slice relatively shallow caps from the corn kernels. As previously indicated, such cream-style cutters are well known in the art and need, therefore, be described in the briefest terms only. They comprise a plurality of blades which are arranged along a cylindrical surface and form an outwardly directed circular cutting edge. Said blades are mounted for rotation about a horizontal center axis and the corn ears are conducted coaxially against the rotating cutting edge and through the tubular hollow formed by the blades. Said blades are resiliently mounted and possess feelers which extend into the path of the approaching corn ears and continually vary the diameter of the tubular blade arrangement according to the varying diametrical sizes of the processed corn ears. Manually adjustable means are provided to set a definite difference between the diameter of the corn ears as indicated by the feelers and the diameter of the tubular blade arrangement so as to pre-establish the depth of the caps which said blades slice from the kernels of the corn ears. Behind the described kernel capping arrangement the cream-style cutters possess mechanism composed of a plurality of blunt scraping knives arranged for rotation along a cylindrical surface in a manner similar to the above described capping blades. As the capped corn ears pass through the tubular hollow formed by said scraping knives, these knives scrape the interior from the decapitated kernel portions seated in the corn cobs, so that the cobs finally ejected from the machine are deprived of practically all matter that may be used for human consumption.

In the exemplary process of our invention that we are about to describe, the cream-style cutter was adjusted in such a manner that 1,500 pounds of husked corn ears of the type specified above were divided into 375 pounds of caps and 375 pounds of scrapings, with the remaining 750 pounds representing the weight of the empty corn cobs and other debris.

Both, the caps and the scrapings, were collected in a common hopper arranged below the cream-style cutter, as they dropped from the corn ears and were then treated in the conventional manner to remove debris and corn silk. Thereafter, they were conducted into a batch mixer to be blended with the usual corn cream additives; i. e., primarily water, salt and sugar. Thus the previously mentioned 375 pounds of caps and 375 pounds of scrapings were mixed with 10 gallons of water and 10 gallons of a syrup prepared by dissolving 700 pounds of sugar and 140 pounds of salt in sufficient water to make a final volume of 200 gallons. This mixture was then heated in a mixer having a plurality of perforated pipes attached to a steam line. As the product was being mixed steam was introduced directly into the body of the mass until a temperature of 180° was reached. The condensate resulting condensed from this steam treatment increased the volume of the mixture from 100 gallons to 110 gallons. In accordance with our invention we also added at least 0.25% by weight of the particular modified starch described above.

In the exemplary embodiment of our invention which we are about to describe we added five pounds of a corn starch that had been treated in the following manner: A mixture of corn starch and water of a density of 17° Baumé was heated to about 75° F. and chlorine was introduced in drops into said mixture until a total of 2.25 grams had been added for each liter of said mixture. The mixture was then held at 75° F. and gently stirred for about 45 minutes, whereupon it was neutralized to a pH of 5.2 with sodium hydroxide and filtered, washed and dried. The hot paste viscosity of the starch treated in the above described manner was at least 125 measured in accordance with the standardizing test known as the "Scott test" and its cold paste viscosity; i. e., its viscosity after it was cooled to room temperature, was approximately 75–80 measured with the Stormer viscometer. The starch was then sterilized in the following manner: It was placed into a closed chamber, which was evacuated to 22 inches, and was heated to a temperature of about 110° F. for a period of about one hour. Three and one-half pounds of substantially undiluted ethylene oxide gas per 35 cubic feet of chamber space were then admitted into said chamber and the starch exposed to said gas at substantially the same temperature for at least 2½ hours. In this manner the count of thermophilic anaerobic spores was reduced to values acceptable to the canning industry.

The amount of pre-treated starch required to effectively counteract coagulation in cream-style corn varies for different types of corn depending upon their tendency to coagulate. In general, lesser amounts of the additive will suffice for corn of greater maturity. In practice, the right amount may readily be ascertained for each type of corn by a series of simple pilot tests. We have found that additions of at least 0.25% and preferably 0.50% by weight of the total cream-style corn mix produce satisfactory results in most instances and additions of more than 1.0% rarely show any further improvement in the coagulation characteristics of the treated product. It has, of course, long been common practice in the preparation of cream-style corn to add to the mix in the batch mixer varying amounts of a corn starch, which has been subjected to a high temperature treatment of a duration necessary to reduce bacterial count to commonly acceptable values, so as, it is believed, to increase the consistency of the product and insure smoothness in all those cases where the natural starch content of the corn proved too low to establish the desired degree of consistency. In cases of this kind the amount of the particular corn starch to be added in accordance with our invention may, of course, be increased beyond the quantity necessary to effectively inhibit coagulation, or alternatively the additional quantity of starch necessary to impart a desired consistency to the final product may be made up by ordinary sterilized corn starch without impairment of the beneficial effects secured in accordance with our invention.

Reverting to the batch mixer, the caps and scrapings and the described additives were gently stirred to obtain a uniform mixture and only after such a uniform mixture had been established, were the contents of the batch mixer heated to a temperature of about 180° F. by direct steam injection. Thereafter the mixture was conducted into a tank, where it was combined with the contents of several other batch mixers that had been prepared in a similar manner. The contents of the tank were heated to and maintained at a temperature of 190° F., by directing steam into the mixture.

From the blending tank the mixture was transferred to a consistometer wherein its consistency was diluted to a standard value. The product was now ready for sterilization.

In the exemplary process which we are about to describe the sterilization treatment was applied to the product after it had been filled into metal containers; for this purpose the mix was conducted to a filling turret that filled it into #2 metal cans which have a diameter of 3 9/16" and a height of 4 9/16", and after the cans had been hermetically sealed, they were introduced into a sterilizer of the continuous motion type. Such sterilizers are arranged to advance the cans along a helical path and spin said cans about their main axes as they negotiate the lower sectors of said path. In this manner forced heat convection currents are set up in the interior of the cans which produce rapid and uniform heat penetration of their contents and thus permit a very considerable reduction of the time required to render the corn product thoroughly sterile. In the exemplary process which we have so far described the temperature maintained in the sterilizer was of the order of 260° F., and the time required to properly sterilize the product was about 14 minutes, as compared with a period of 70 minutes at 250° F. required to sterilize cream-style corn from the same blending tank in stationary condition under otherwise identical circumstances.

The resultant product had not visibly coagulated, although it contained no ingredients foreign to ordinary cream-style corn; carmelization was negligible; the color of the product was a bright yellow and its flavor and palatability were substantially the same as that of freshly made cream-style corn, and were far superior to a control sample that had been sterilized in stationary condition. Thus, comparative tests of a sterilized cream-style corn prepared in accordance with our invention and a control sample showed that in the case of the latter product the thiamine content has dropped to only 0.48 microgram per gram, while the product prepared in accordance with our invention retained a thiamine content of 0.76 microgram per gram.

While we have illustrated our invention with the aid of an exemplary process, it will be understood that we do not wish to be limited to any of the particular temperatures, times of exposure, proportions of additives or types of containers nor to the particular sequence of individual process steps mentioned in said example, all of which may be departed from without departing from the scope and spirit of our invention. Furthermore, although our invention is of particular advantage in connection with sterilization methods which involve agitation of the food products, since it permits the application of such sterilization methods with the explained beneficial results where excessive coagulation would formerly have resulted, our invention may also be usefully employed in connection with stationary sterilization methods because it will minimize the ever present danger of coagulation in the batch mixers or the blending tanks. Also, while we have illustrated our invention as applied to the well known method of preparing cream-style corn by cutting the caps from the corn kernels so that they may form the solid constituents of the final product and using the scrapings from the kernel bases for the cream fraction of the product, it will be understood that the steps of our invention may be applied with equal effectiveness to processes for the preparation of cream-style corn wherein whole kernels, or sections thereof, form the solid constituents of the product and its cream fraction is made from ground kernels. Moreover, while the illustrative process provided for sterilization of the cream-style corn within sealed containers, the product of our invention may also be sterilized in bulk in continuous flow tubular heat exchangers and thereafter be filled into containers under aseptic conditions, without exhibiting objectional coagulation effects.

We claim:

1. A coagulation-resistant cream-style corn comprised of a solid corn kernel component and a cream fraction, wherein said cream fraction contains small quantities of a halogen-treated corn starch.

2. A coagulation-resistant cream-style corn comprised of a solid corn kernel component and a cream fraction, wherein said cream fraction contains small quantities of a thick-boiling corn starch.

3. A coagulation-resistant cream-style corn comprised of a solid corn kernel component and a cream fraction, wherein said cream fraction contains small quantities of a halogen-treated thick-boiling corn starch.

4. A coagulation-resistant cream-style corn mix comprised of a solid corn kernel component and a cream fraction, wherein said cream fraction contains a halogen-treated thick-boiling corn starch in quantities of at least 0.25% by weight of the total mix.

5. A coagulation-resistant cream-style corn mix comprised of a solid corn kernel component and a cream fraction, wherein said cream fraction contains a halogen-treated thick-boiling and thick-setting corn starch in quantities of the order of from 0.25% to 1.0% by weight of the total mix.

6. The method of producing a coagulation-resistant cream-style corn mix which comprises incorporating into the cream fraction thereof a small quantity of a halogen-treated thick-boiling corn starch.

7. The method of producing a coagulation-resistant cream-style corn mix, which comprises incorporating into the cream fraction thereof, prior to subjecting it to elevated temperatures, a quantity of at least 0.25% by weight of the total mix, of a halogen-treated thick-boiling corn starch.

8. The method of producing a non-coagulated sterilized cream-style corn mix that closely resembles fresh cream-style corn in color and flavor, which comprises incorporating into the cream fraction of said mix, prior to subjecting it to elevated temperatures, quantities of at least 0.25% by weight, of the total mix of a halogen-treated thick-boiling corn starch that has been sterilized by means of a low temperature sterilizing process, and thereafter sterilizing the total mix under agitation by a high temperature short-duration sterilization process.

9. The method of producing a non-coagulated sterilized cream-style corn mix that closely resembles fresh cream-style corn in color and flavor, which comprises incorporating into the cream fraction of said mix during the blending thereof and prior to subjecting it to elevated temperatures quantities of at least 0.25% by weight, of the total mix, of a halogen-treated thick-boiling corn starch that has been sterilized by exposure to ethylene oxide in a vacuum and thereafter sterilizing the total mix under agitation by a high-temperature short-duration sterilization process.

ROBERT A. WHITMORE.
FRANK D. HICKEY.

REFERENCES CITED

The following references are of record in the file of this patent:

UNITED STATES PATENTS

| Number | Name | Date |
| --- | --- | --- |
| 2,000,892 | Lewis | May 7, 1935 |
| 2,189,947 | Griffith et al. | Feb. 13, 1940 |